US012566572B2

(12) United States Patent
Kumar N et al.

(10) Patent No.: US 12,566,572 B2
(45) Date of Patent: Mar. 3, 2026

(54) METHOD FOR OPTIMIZING INTERFACE TRAINING ON A STORAGE DEVICE

(71) Applicant: SANDISK TECHNOLOGIES, INC., Milpitas, CA (US)

(72) Inventors: Mohith Kumar N, Bangalore (IN); Vishal Sharma, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 54 days.

(21) Appl. No.: 18/533,565

(22) Filed: Dec. 8, 2023

(65) Prior Publication Data

US 2025/0190142 A1 Jun. 12, 2025

(51) Int. Cl.
*G06F 3/06* (2006.01)

(52) U.S. Cl.
CPC .......... *G06F 3/0658* (2013.01); *G06F 3/0619* (2013.01); *G06F 3/0679* (2013.01)

(58) Field of Classification Search
CPC ..... G06F 3/0658; G06F 3/0619; G06F 3/0679
See application file for complete search history.

(56) References Cited

U.S. PATENT DOCUMENTS 6,670,821 B2 * 12/2003 Ajit ................ H03K 19/018571
327/170
7,157,932 B2 * 1/2007 El-Kik ............. H03K 19/00369
327/108

7,432,731 B2 * 10/2008 Bains ............... G11C 29/50008
326/56
10,216,420 B1 2/2019 Kannan
10,310,999 B2 6/2019 Zerbe
10,949,094 B2 3/2021 Lee
11,082,036 B2 8/2021 Marko
11,237,579 B2 * 2/2022 He ......................... G11C 29/022
2017/0123446 A1 * 5/2017 Siddula ................... G05F 3/245
2020/0201705 A1 * 6/2020 Kim ..................... G11C 7/1093
2021/0081109 A1 * 3/2021 Wang ................... G11C 29/028

* cited by examiner

*Primary Examiner* — Mark A Giardino, Jr.

(74) *Attorney, Agent, or Firm* — Arlene Neal; NEAL BLIBO LLC

(57) ABSTRACT

A storage device optimizes interface training between a controller and a memory device. The memory device includes at least one die on which data is stored. The controller categorizes process, voltage, and temperature (PVT) values into zones and executes an initial calibration on each zone using categorized values assigned to each zone. The controller obtains calibration data for the zones from the initial calibration and stores the calibration data. When the controller determines that an interface training is triggered, the controller performs a subsequent calibration. During the subsequent calibration, the controller retrieves the calibration data and applies the retrieved calibration data to align a data signal with a clock signal and to perform normal operations on the storage device at a current PVT setting.

17 Claims, 6 Drawing Sheets

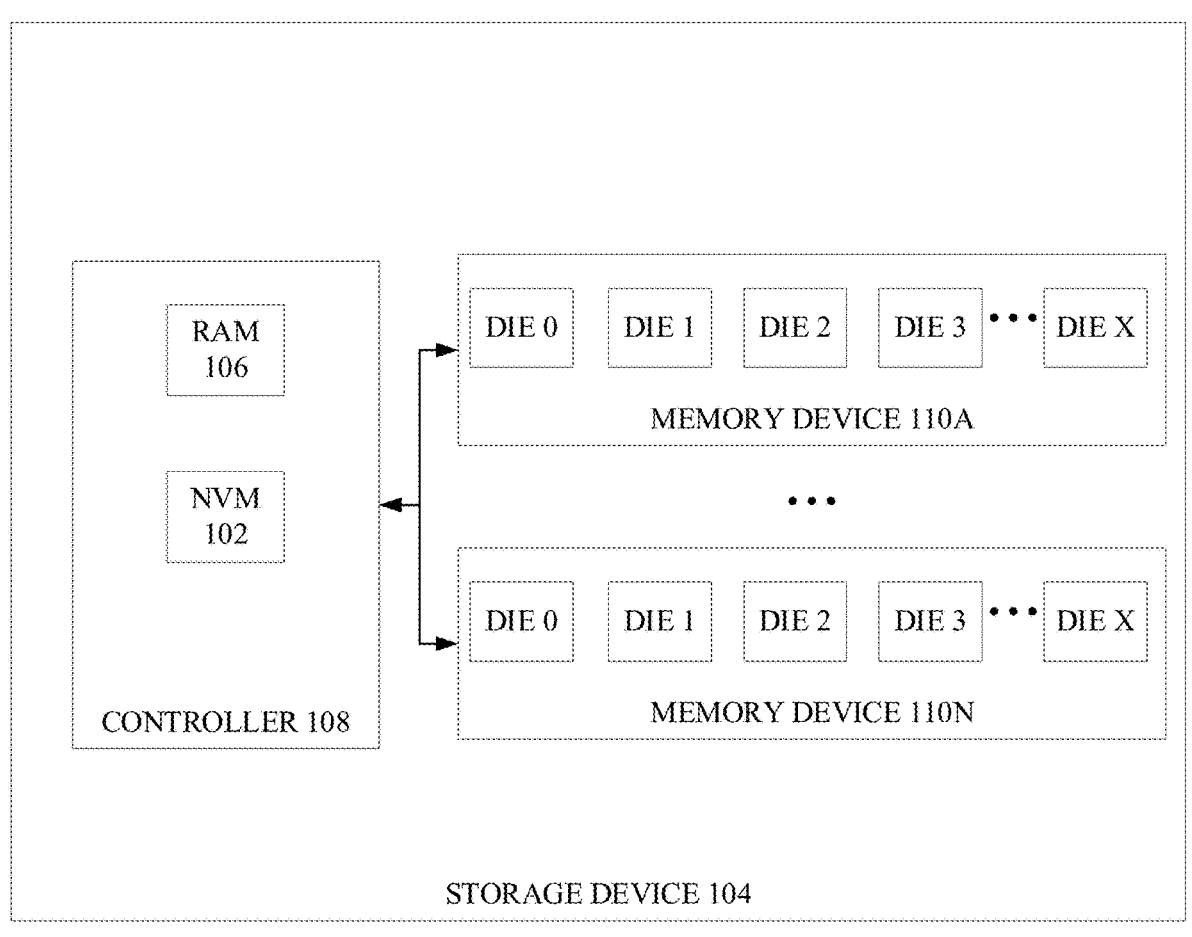
FIG. 1

| ZONE 202 | TEMP IN CELSIUS 204 | IDEAL PMIC VOLTAGE 206 | PROCESS RON 208 | READ DQ, DQS OFFSET (ns) 210 | WRITE DQ, DQS OFFSET (ns) 212 | DCC REn OFFSET (ns) 214 |
|---|---|---|---|---|---|---|
| 0 | -40 TO 0 | 3.3 | <1% | 600 | 500 | 550 |
| 1 | 1 TO 25 | 3.3 | <1% | 120 | 100 | 110 |
| 2 | 26 TO 50 | 3.3 | <1% | 50 | 40 | 45 |
| 3 | 51 TO 85 | 3.0 | <1% | 400 | 300 | 350 |
| 4 | 86 TO 125 | 2.5 | <1% | 800 | 600 | 700 |

CALIBRATION STRUCTURE 200

FIG. 2

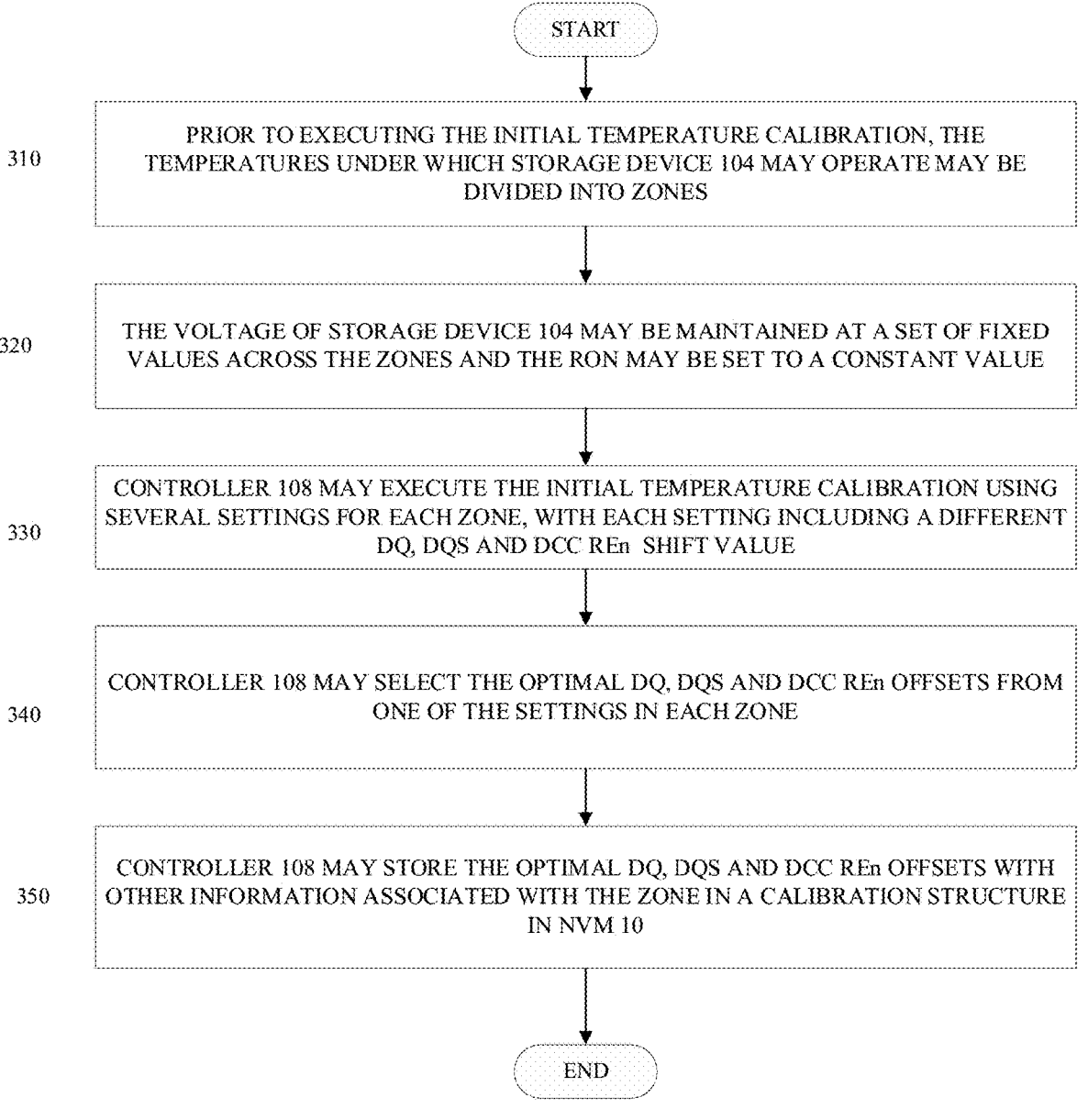

START

310    PRIOR TO EXECUTING THE INITIAL TEMPERATURE CALIBRATION, THE TEMPERATURES UNDER WHICH STORAGE DEVICE 104 MAY OPERATE MAY BE DIVIDED INTO ZONES

320    THE VOLTAGE OF STORAGE DEVICE 104 MAY BE MAINTAINED AT A SET OF FIXED VALUES ACROSS THE ZONES AND THE RON MAY BE SET TO A CONSTANT VALUE

330    CONTROLLER 108 MAY EXECUTE THE INITIAL TEMPERATURE CALIBRATION USING SEVERAL SETTINGS FOR EACH ZONE, WITH EACH SETTING INCLUDING A DIFFERENT DQ, DQS AND DCC REn SHIFT VALUE

340    CONTROLLER 108 MAY SELECT THE OPTIMAL DQ, DQS AND DCC REn OFFSETS FROM ONE OF THE SETTINGS IN EACH ZONE

350    CONTROLLER 108 MAY STORE THE OPTIMAL DQ, DQS AND DCC REn OFFSETS WITH OTHER INFORMATION ASSOCIATED WITH THE ZONE IN A CALIBRATION STRUCTURE IN NVM 10

END

FIG. 3

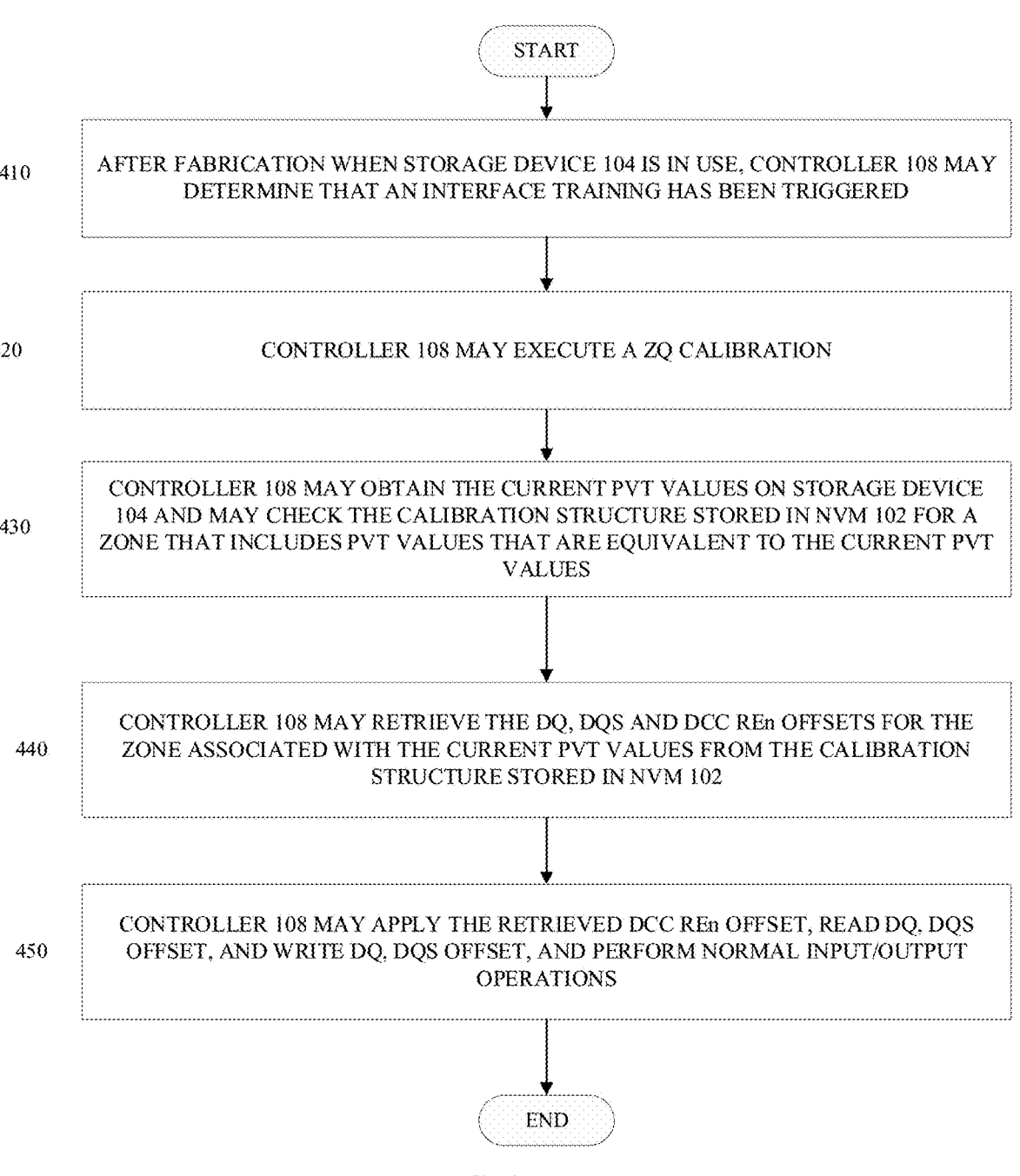

START

410
AFTER FABRICATION WHEN STORAGE DEVICE 104 IS IN USE, CONTROLLER 108 MAY DETERMINE THAT AN INTERFACE TRAINING HAS BEEN TRIGGERED

420
CONTROLLER 108 MAY EXECUTE A ZQ CALIBRATION

430
CONTROLLER 108 MAY OBTAIN THE CURRENT PVT VALUES ON STORAGE DEVICE 104 AND MAY CHECK THE CALIBRATION STRUCTURE STORED IN NVM 102 FOR A ZONE THAT INCLUDES PVT VALUES THAT ARE EQUIVALENT TO THE CURRENT PVT VALUES

440
CONTROLLER 108 MAY RETRIEVE THE DQ, DQS AND DCC REn OFFSETS FOR THE ZONE ASSOCIATED WITH THE CURRENT PVT VALUES FROM THE CALIBRATION STRUCTURE STORED IN NVM 102

450
CONTROLLER 108 MAY APPLY THE RETRIEVED DCC REn OFFSET, READ DQ, DQS OFFSET, AND WRITE DQ, DQS OFFSET, AND PERFORM NORMAL INPUT/OUTPUT OPERATIONS

END

METHOD FOR OPTIMIZING INTERFACE TRAINING ON A STORAGE DEVICE

BACKGROUND

A storage device may be communicatively coupled to a host and to non-volatile memory including, for example, a NAND flash memory device on which the storage device may store data received from the host. The storage device may include a controller that may control operations on the storage device. The memory device may include one or more dies on which data may be stored. The interface between the controller and the memory device may be critical to governing the reliable transfer of data between the controller and the memory device. This transfer may depend on process, voltage, or temperature (PVT) variations. The PVT variations may govern the shape and delay of data signals and clock signals. When a PVT variation occurs, it may be important to re-calibrate the interface between the controller and the memory device. If such re-calibration is not done when these variations are encountered, there is a chance that the variation may affect the aligning of the data signal with a clock signal due to poor margin delay of a data valid window (DVW), which may increase the bit error rate (BER) and reduce the data reliability of the storage device.

To ensure that PVT variations or a power on/reset (POR) of the storage device does not affect the aligning of the data signal and the clock signal, when the storage device is reset/powered on or when there is a PVT variation on the storage device that exceeds a predefined threshold, the storage device may perform an interface training between the controller and the memory device. The interface training may include equalization (ZQ) calibration, i.e., calibration of input-output (IO) driver impedance values on the controller and the memory device. The interface training may also include duty cycle correction (DCC) calibration, read calibration, and write calibration. The DCC calibration may be performed to improve the duty-cycle of incoming read enable (REn), which also improves the duty-cycle of the data signal and the clock signal, thus improving the read performance. Read calibration and write calibration may be performed on the controller by adjusting the data signal and the clock signal delays obtaining more DVW margins when targeting for higher toggle mode (TM) speed.

Typically, process variation may refer to die-to-die variations and differences in trimmed values during die sorting (DS) compared to an actual ball grid array (BGA) with different die stacking for manufacturing the storage device. When interface parameters are trimmed at DS, those trimmed values are specific to that die. When different die stacking is used, the values must be recalibrated according to the current PVT conditions. This process variation parameter (Ron) for a current memory device may exhibit a negative temperature coefficient and may depend on fabrication methods to maintain it within a tolerable range. Current memory device designs have achieved less than 1% variation from their actual Ron value. The voltage used by the storage device is typically set during fabrication and may be managed and maintained by a power management integrated circuit (PMIC) when the storage device is in use. Therefore, process or voltage variations may be treated as constants, as the tolerance limits that would require them to be considered as a variation for triggering interface training may be unlikely to occur on a storage device.

Temperature variations may occur during POR that could affect the memory device's parameters, since all these impedances are a function of temperature. Temperature variations may also depend on how the storage device is being used. For instance, temperature variations may depend on the temperature of the components on the storage device and the ambient temperature. For example, in an automobile application, if the storage device is left in a hot vehicle, the temperature of the storage device may change from a cold to hot region (C2H) or a hot to cold region (H2C) very quickly. In an example with an external solid-state drive (eSSD) application, the variation in temperatures may not be as aggressive as seen for an automobile application. In an existing approach, when such a temperature variation crosses a predefined threshold either, for example, entering from C2H or H2C regions, the storage device may acquire a current system temperature and store it as its current temperature. The storage device may calculate the absolute difference between the current temperature and the last recorded temperature. If the absolute difference is greater than a temperature threshold for a given application the storage device may trigger interface training, wherein the storage device may perform the ZQ, DCC, read, and write calibrations.

The storage device may take approximately one microsecond (µs) for ZQ calibration and 25 us for DCC calibration. In addition, there may be read and/or write training latency which may depend on size of the data pattern and TM speed. There may also be firmware overhead latency. All these latencies added together are for a single die of the memory device. As the storage capacity of the storage device increases and the number of dies on the memory device increases, the time for performing interface training and calibrating the controller with the memory device may also increase as each die may need to be calibrated before it can be used by the storage device. For a N die-based design, the training time may increase by N times the total interface training time taken for a signal die. The interface training time associated with each POR or PVT variation may thus affect the overall system performance of the storage device because as the interface training time on a storage device increases, the overall performance of the storage device may be reduced. Accordingly, there may be a need to reduce calibration events and optimize interface training to reduce the time for calibrating the controller with the memory device.

SUMMARY

In some implementations, a storage device may optimize the interface training between a controller and a memory device. The memory device includes at least one die on which data is stored. The controller categorizes process, voltage, and temperature (PVT) values into zones and executes an initial calibration using categorized values. The controller obtains calibration data for the zones from the initial calibration and stores the calibration data. When the controller determines that an interface training is triggered, the controller performs a subsequent calibration. During the subsequent calibration, the controller retrieves the calibration data and applies the retrieved calibration data to align a data signal with a clock signal and to perform normal operations on the storage device at a current PVT setting.

In some implementations, a method is provided for optimizing the interface training between the controller and the memory device including at least one die on which data is stored. The method includes categorizing process, voltage, and temperature (PVT) values into zones, executing an initial calibration using categorized values, and obtaining calibration data for the zones from the initial calibration. The method also includes storing the calibration data and determining that an interface training is triggered. The method further includes performing a subsequent calibration including retrieving the calibration data and applying the retrieved calibration data to align a data signal with a clock signal and perform normal operations on the storage device under at a current PVT setting.

In some implementations, a method is provided for optimizing the interface training between the controller and the memory device including at least one die on which data is stored. The method includes categorizing process, voltage, and temperature (PVT) values into zones, executing an initial calibration using categorized PVT values, and storing calibration data obtained from the initial calibration for the zones. The method also includes determining that an interface training is triggered and executing a subsequent calibration. The subsequent calibration includes identifying current PVT values under which the storage device is operating, retrieving the calibration data for a zone associated with the current PVT values, and applying an optimal data signal, clock signal, and read enable offset from retrieved calibration data to perform normal operations on the storage device under the current PVT values.

BRIEF DESCRIPTION OF THE SEVERAL VIEWS OF THE DRAWINGS

FIG. 1 is a schematic block diagram of an example storage device in accordance with some implementations.

FIG. 2 is a block diagram of an exemplary calibration structure obtained after characterization for an initial calibration run in accordance with some implementations.

FIG. 3 is a flow diagram of an exemplary process for executing an initial temperature calibration to categorize temperature variations that may occur on a storage device in accordance with some implementations.

FIG. 4 is a flow diagram of an exemplary process for executing a subsequent calibration in accordance with some implementations.

Figure 5:
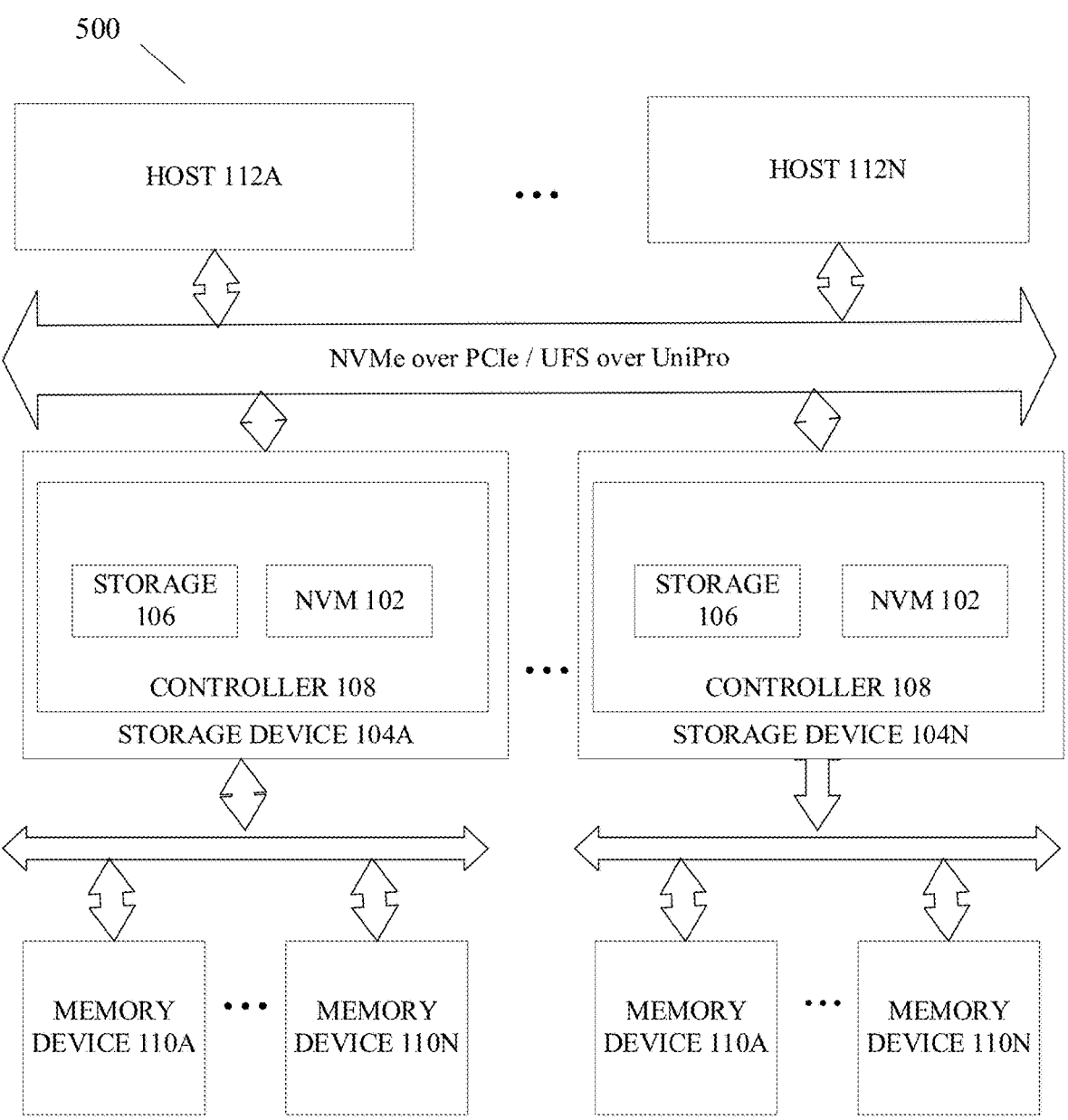
FIG. 5 is a diagram of an example environment in which systems and/or methods described herein are implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example storage device in accordance with some implementations. Storage device 104 may include a non-volatile memory (NVM) 102, a random-access memory (RAM) 106, a controller 108, and one or more non-volatile memory devices 110a-110n (referred to herein as the memory device(s) 110). Storage device 104 may be, for example, a solid-state drive (SSD), and the like. NVM 102 may be a register or other non-volatile memory in storage device 104 for storing one or more calibration structures. RAM 106 may be temporary storage such as a dynamic RAM (DRAM) that may be used to cache information in storage device 104.

Controller 108 may interface with a host and process foreground operations including instructions transmitted from the host. For example, controller 108 may read data from and/or write to memory device 110 based on instructions received from the host. Controller 108 may also execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may include multiple dies (shown as Die 0-Die X). Memory device 110 may be included in storage device 104 or may be otherwise communicatively coupled to storage device 104.

During firmware production, controller 108 may execute an initial calibration process on storage device 104. The initial calibration process may be used to categorize process, voltage, and/or temperature (PVT) variations that may occur on storage device 104. For example, controller 108 may execute an initial calibration to account for temperature variations (also referred to herein as an initial temperature calibration) that may occur on storage device 104. When controller 108 executes the initial temperature calibration to account for temperature variations that may occur on storage device 104, controller 108 may use a fixed set of constant values for the voltage and process. Similarly, controller 108 may execute an initial calibration to account for voltage variations that may occur on storage device 104, with a fixed set of constant temperature and process values. Controller 108 may also execute an initial calibration to account for process variations that may occur on storage device 104, with a fixed set of constant temperature and voltage values. The process parameter (also referred to herein as Ron) variations may be caused by variation in the impedance of the die input/output on memory device 110, which affects the signal integrity.

Prior to executing the initial calibration process, different PVT values associated with the type of calibration being performed in the initial calibration process may be categorized/divided into zones. A zone may represent a unique PVT criterion for which the associated calibration values include one or more offset values for aligning the data signal (DQ) with the clock signal (DQS) during operations on storage device 104. For example, prior to executing the initial temperature calibration, the different temperatures under which storage device 104 may operate may be categorized into zones. As noted, when a temperature variation exceeds a predefined temperature threshold, the data signal may be misaligned from the clock signal. As such, controller 108 may execute the initial temperature calibration to obtain offset values for adjusting the clock signal so that it aligns with the data signal when the storage device 104 is operating at a given temperature in a zone.

In an example, prior to executing the initial temperature calibration to account for temperature variations on storage device 104, the temperatures under which storage device 104 may operate may be divided into five zones. Each zone may be associated with a subset temperature range, with the zones covering the range of temperatures under which storage device 104 may operate. For example, if storage device 104 can operate under temperatures ranging from −40° C. to 125° C., zone 0 may be associated with a subset temperature range from −40° C. to 0° C., zone 1 may be associated with a subset temperature range from 1° C. to 25° C., zone 2 may be associated with a subset temperature range from 26° C. to 50° C., zone 3 may be associated with a subset temperature range from 51° C. to 85° C., and zone 4 may be associated with a subset temperature range from 86° C. to 125° C.

During the initial temperature calibration, controller 108 may obtain the optimal DQ, DQS offsets for aligning the data signal and clock signal when storage device 104 is operating under conditions identified in a zone. The optimal DQ, DQS offsets may include a duty cycle correction (DCC) read enable REn offset, a read DQ, DQS offset, and a write DQ, DQS offset. In executing the initial temperature calibration, the voltage of storage device 104 may be maintained at, for example, 2.5-3.3 volts across the zones, and the Ron may be set at less than one percent. Controller 108 may execute the initial temperature calibration using several settings for each zone. Each setting may include a different DQ, DQS and DCC REn shift value. For example, controller 108 may execute the initial temperature calibration using five settings in each zone, wherein each setting may include a different DQ, DQS and DCC REn shift value. Controller 108 may select the optimal DQ, DQS and DCC REn offsets from the DQ, DQS and DCC REn offsets associated with one of the settings in a zone. The selected DQ, DQS and DCC REn offsets for a zone may be associated with the DQ, DQS and DCC REn shift values resulting in the lowest bit error rate. Controller 108 may store the selected/optimal DQ, DQS and DCC REn offsets with other information associated with the zone in a calibration structure in NVM 102.

Controller 108 may also execute an initial calibration process to account for process and/or voltage variations. In executing the initial calibration process to account for process variations, controller 108 may categorize the various processes that may occur on storage device 104 into one or more zones and may keep the temperature and voltage values constant across the zones. Similarly, in executing the initial calibration process to account for voltage variations, controller 108 may categorize different voltage values under which storage device 104 may operate into one or more zones and may keep the temperature and process values constant across the zones. Controller 108 may also obtain the optimal DQ, DQS and DCC REn offsets for process and/or voltage variations that may occur on storage device 104 and may store the selected DQ, DQS and DCC REn offsets with other information associated with the zone in the calibration structure in NVM 102. As such, the calibration structure stored in NVM 102 may include calibration data associated with temperature, voltage, and/or process variations divided into various zones.

After firmware production when storage device 104 is in use, controller 108 may determine when an interface training has been triggered. For example, controller 108 may determine when a PVT variation occurs on storage device 104 and whether the PVT variation exceeds a predefined threshold or when there is a power reset on storage device 104 such that interface training may be triggered. If, for example, a temperature variation exceeds the predefined temperature threshold, controller 108 may perform a calibration (also referred to herein as a subsequent calibration). The subsequent calibration may include a ZQ calibration. As part of the subsequent calibration, controller 108 may obtain the current PVT values on storage device 104 and may check the calibration structure stored in NVM 102 for a zone that includes PVT values that are equivalent to the current PVT values.

Rather than performing another DCC calibration, read calibration, and write calibration as part of the subsequent calibration to determine the DQ, DQS offsets needed to align the data signal with the clock single under the current PVT conditions, controller 108 may retrieve the DQ, DQS and DCC REn offsets for the zone associated with the current PVT values from the calibration structure stored in NVM 102. Controller 108 may apply the retrieved DCC REn offset, read DQ, DQS offset, and write DQ, DQS offset. Storage device 104 may then perform normal input/output operations. Storage device 104 may therefore optimize the interface training time by reducing the number of calibrations that may have to be performed each time interface training is triggered.

Storage device 104 may perform these processes based on a processor, for example, controller 108 executing software instructions stored by a non-transitory computer-readable medium, such as storage component/memory device 110. As used herein, the term "computer-readable medium" refers to a non-transitory memory device. Software instructions may be read into memory device 110 from another computer-readable medium or from another device. When executed, software instructions stored in memory device 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. Storage device 104 may include additional components (not shown in this figure for the sake of simplicity). FIG. 1 is provided as an example. Other examples may differ from what is described in FIG. 1.

FIG. 2 is a block diagram of an exemplary calibration structure obtained after characterization for an initial calibration run in accordance with some implementations. Calibration structure 200 may include various zones 202. Each zone 202 may include a range of temperatures 204 under which storage device 104 may operate. Each zone may also include a voltage 206 and process (Ron) 208 under which storage device 104 may operate. Voltage 206 may be within a range of 3.3-2.5 volts across the zones and Ron 208 may be set at less than one percent. Each zone may also include DQ, DQS offsets 210-212 and DCC REn offset 214 that were generated as part of an initial temperature calibration. The DQ, DQS offsets and DCC REn offset for each zone may be the optimal DQ, DQS offsets and DCC REn offset selected when the initial temperature calibration was executed using several settings for each zone.

When storage device 104 is being used and there is a temperature variation above a temperature threshold, controller 108 may perform the subsequent calibration including a ZQ calibration. As part of the subsequent calibration, controller 108 may calculate the current PVT values. If in calculating the current PVT values controller 108 determines that the current temperature of storage device 104 is, for example, −20° C., controller 108 may determine that the current temperature of storage device 104 falls within a temperature range in zone 0. Controller 108 may retrieve the DQ, DQS offsets and DCC REn offset for zone 0 to align the data signal with the clock signal at –20° C. Controller 108 may apply the retrieved DCC REn offset 214 to duty cycle correction, DQ, DQS read offset 210 to read operations, and DQ, DQS write offset 212 to write operations and perform normal input/output operations, for example, controller 108 may adjust the clock signal via 600 nanoseconds (ns) for read operations, 500 ns for write operations, and 550 ns for duty cycle correction.

When there is another temperature variation above the temperature threshold, controller 108 may perform another subsequent calibration including executing a ZQ calibration and calculating the current PVT values. If the temperature of storage device 104 changes to, for example, 30° C., controller 108 may determine that the current temperature of storage device 104 falls within the temperature range in zone 2, To align the data signal with the clock signal at 30° C., controller 108 may obtain the associated DQ, DQS offsets and DCC REn offset 210-214 for zone 2. Controller 108 may apply DCC REn offset 214 to duty cycle correction, DQ, DQS read offset 210 to read operations, and DQ, DQS write offset 212 to write operations such that the data signal and clock signal may be aligned while storage device is operating at 30° C. FIG. 2 is provided as an example. Other examples may differ from what is described in FIG. 2.

FIG. 3 is a flow diagram of an exemplary process for executing an initial temperature calibration to categorize temperature variations that may occur on a storage device in accordance with some implementations. At 310, prior to executing the initial temperature calibration, the temperatures under which storage device 104 may operate may be divided into zones. At 320, the voltage of storage device 104 may be maintained at a set of fixed values across the zones and the Ron may be set to a constant value. At 330, controller 108 may execute the initial temperature calibration using several settings for each zone, with each setting including a different DQ, DQS and DCC REn shift value. At 340, controller 108 may select the optimal DQ, DQS and DCC REn offsets from one of the settings in each zone. At 350, controller 108 may store the optimal DQ, DQS offsets with other information associated with the zone in a calibration structure in NVM 102. FIG. 3 is provided as an example. Other examples may differ from what is described in FIG. 3.

FIG. 4 is a flow diagram of an exemplary process for executing a subsequent calibration in accordance with some implementations. At 410, after fabrication when storage device 104 is in use, controller 108 may determine that an interface training has been triggered. At 420, controller 108 may execute a ZQ calibration. At 430, controller 108 may obtain the current PVT values on storage device 104 and may check the calibration structure stored in NVM 102 for a zone that includes PVT values that are equivalent to the current PVT values. At 440, controller 108 may retrieve the DQ, DQS offsets for the zone associated with the current PVT values from the calibration structure stored in NVM 102. At 450, controller 108 may apply the retrieved DCC REn offset, read DQ, DQS offset, and write DQ, DQS offset, and perform normal input/output operations. FIG. 4 is provided as an example. Other examples may differ from what is described in FIG. 4.

FIG. 5 is a diagram of an example environment in which systems and/or methods described herein are implemented. As shown in FIG. 5, Environment 500 may include hosts 112-112*n* (referred to herein as host(s) 112), and storage devices 104*a*-104*n* (referred to herein as storage device(s) 104).

Storage device 104 may include a controller 108 to optimize the interface training between controller 108 and memory device 110. Hosts 112 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
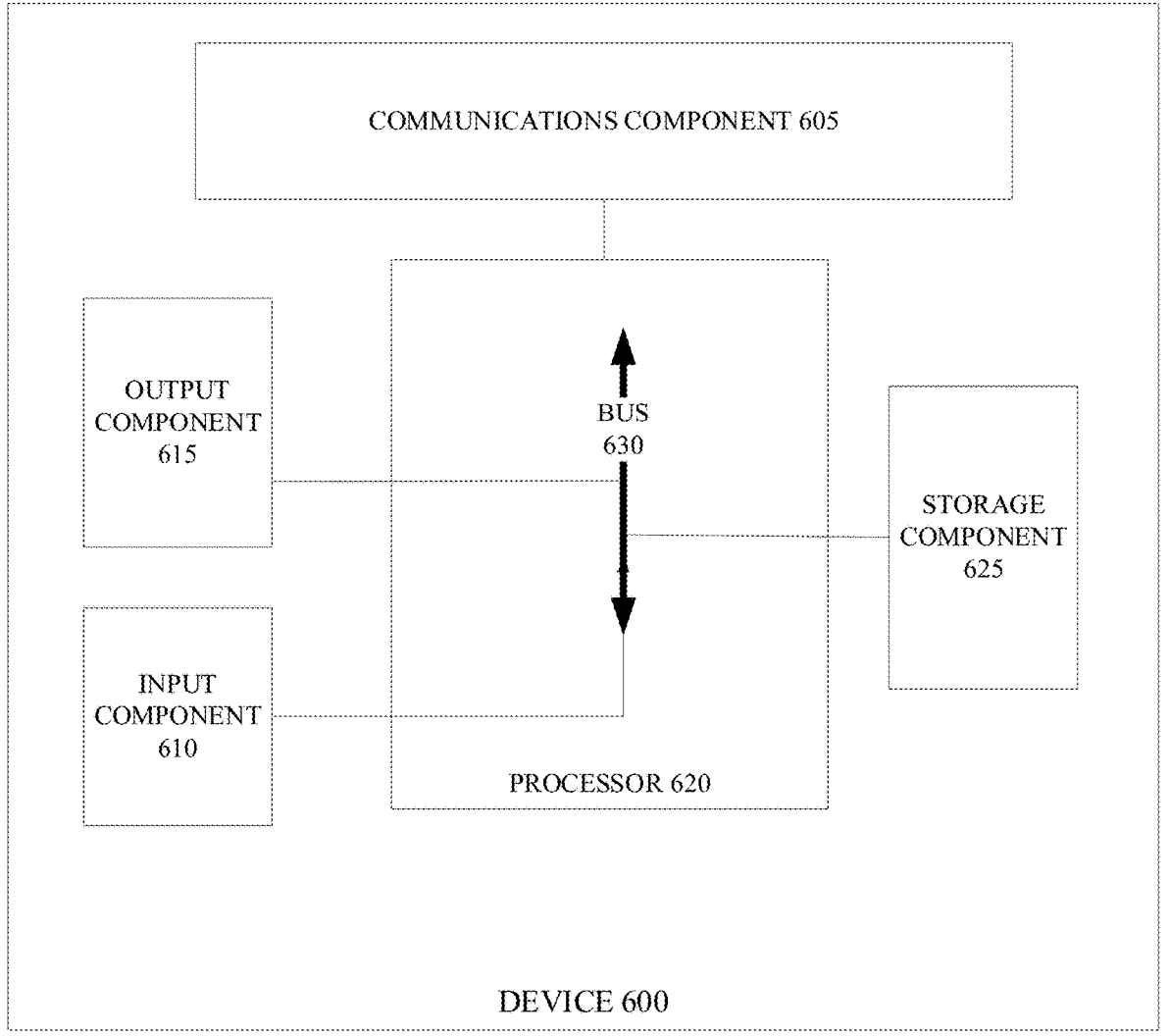
FIG. 6 is a diagram of example components of one or more devices of FIG. 1.

FIG. 6 is a diagram of example components of one or more devices of FIG. 1. In some implementations, host 112 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device optimizes interface training between a controller and a memory device, the storage device comprises:

a memory device including at least one die on which data is stored; and a controller to:

categorize process, voltage, and temperature (PVT) values into zones, wherein a zone represents a unique PVT criterion for which associated calibration values include an optimal data signal, clock signal, and read enable offset for aligning data signal with clock signal, execute an initial calibration using categorized values, obtain calibration data for the zones from the initial calibration, and store the calibration data, and determine that an interface training is triggered and perform a subsequent calibration including retrieving the calibration data and applying retrieved calibration data to align the data signal with the clock signal and perform normal operations on the storage device at a current PVT setting.

2. The storage device of claim 1, wherein during the subsequent calibration, the controller identifies current PVT values under which the storage device is operating, retrieves the calibration data in a zone that includes the current PVT values, and applies an optimal data signal, clock signal, and read enable offset associated with the zone to perform normal operations on the storage device.

3. The storage device of claim 1, wherein the optimal data signal, clock signal, and read enable offset includes a duty cycle correction read enable offset, a read data signal and clock signal offset, and a write data signal and clock signal offset, wherein during the subsequent calibration, the controller retrieves the duty cycle correction read enable offset, the read data signal and clock signal offset, and the write data signal and clock signal offset and applies retrieved offsets to align the data signal and the clock signal during normal operations on the storage device.

4. The storage device of claim 1, wherein the controller categorizes a range of temperatures under which the storage device may operate into the zones, with each zone including a subset temperature range.

5. The storage device of claim 1, wherein when executing the initial calibration, the controller uses varying temperature values and maintains a fixed set of voltage values and a fixed set of process values across the zones.

6. The storage device of claim 1, wherein the controller executes the initial calibration in more than one settings in a zone, with each setting including a different data signal, clock signal, and read enable shift value and the controller selects an optimal data signal, clock signal, and read enable offset for the data signal, clock signal, and read enable shift value resulting in a lowest bit error rate.

7. The storage device of claim 1, wherein the subsequent calibration includes a ZQ calibration.

8. The storage device of claim 1, wherein the controller stores the calibration data in a non-volatile memory.

9. A method on a storage device for optimizing interface training between a controller and a memory device including at least one die on which data is stored, the controller executes the method comprising:

categorizing process, voltage, and temperature (PVT) values into zones, wherein a zone represents a unique PVT criterion for which associated calibration values include an optimal data signal, clock signal, and read enable offset for aligning data signal with clock signal;

executing an initial calibration using categorized values and obtaining calibration data for the zones from the initial calibration;

storing the calibration data;

determining that an interface training is triggered; and performing a subsequent calibration including retrieving the calibration data and applying retrieved calibration data to align the data signal with the clock signal and perform normal operations on the storage device at a current PVT setting.

10. The method of claim 9, wherein performing the subsequent calibration includes identifying current PVT values under which the storage device is operating, retrieving the calibration data associated with a zone and the current PVT values, and applying an optimal data signal, clock signal, and read enable offset associated with the zone to perform normal operations on the storage device.

11. The method of claim 9, wherein executing the initial calibration includes generating an optimal data signal, clock signal, and read enable offset for aligning the data signal with the clock signal and storing the optimal data signal, clock signal, and read enable offset for a zone in a non-volatile memory, wherein the zone represents a unique PVT criterion.

12. The method of claim 11, wherein the optimal data signal, clock signal, and read enable offset includes a duty cycle correction read enable offset, a read data signal and clock signal offset, and a write data signal and clock signal offset, wherein performing the subsequent calibration includes retrieving and applying the duty cycle correction read enable offset, the read data signal and clock signal offset, and the write data signal and clock signal offset to align the data signal and the clock signal and perform normal operations on the storage device.

13. The method of claim 9, wherein the categorizing further comprises categorizing a range of temperatures under which the storage device may operate into the zones, with each zone including a subset temperature range.

14. The method of claim 9, wherein when executing the initial calibration, the method comprises using varying temperature values and maintaining a fixed set of voltage values and a fixed set of process values across the zones.

15. The method of claim 9, executing the initial calibration includes further comprises executing the initial calibration in more than one setting in a zone, with each setting including a different data signal, clock signal, and read enable shift value and selecting an optimal data signal, clock signal, and read enable offset for the data signal, clock signal, and read enable shift value resulting in a lowest bit error rate.

16. The method of claim 9, wherein performing the subsequent calibration includes executing a ZQ calibration.

17. A method on a storage device for optimizing interface training between a controller and a memory device including at least one die on which data is stored, the controller executes the method comprising:

categorizing process, voltage, and temperature (PVT) values into zones, executing an initial calibration using categorized PVT values and storing calibration data obtained from the initial calibration for the zones, determining that an interface training is triggered; and executing a subsequent calibration including identifying current PVT values under which the storage device is operating, retrieving the calibration data for a zone associated with the current PVT values, and applying an optimal data signal, clock signal, and read enable offset from retrieved calibration data to perform normal operations on the storage device under the current PVT values.

* * * * *